(12) United States Patent
Ananthakrishnan et al.

(10) Patent No.: US 9,037,889 B2
(45) Date of Patent: May 19, 2015

(54) APPARATUS AND METHOD FOR DETERMINING THE NUMBER OF EXECUTION CORES TO KEEP ACTIVE IN A PROCESSOR

(71) Applicants: Avinash N. Ananthakrishnan, Hillsboro, OR (US); Julien Fefe Sebot, Haifa (IL); Jay D. Schwartz, Aloha, OR (US); Stephen H. Gunther, Beaverton, OR (US); Eric C. Samson, Santa Clara, CA (US)

(72) Inventors: Avinash N. Ananthakrishnan, Hillsboro, OR (US); Julien Fefe Sebot, Haifa (IL); Jay D. Schwartz, Aloha, OR (US); Stephen H. Gunther, Beaverton, OR (US); Eric C. Samson, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 403 days.

(21) Appl. No.: 13/631,679

(22) Filed: Sep. 28, 2012

(65) Prior Publication Data
US 2014/0095904 A1    Apr. 3, 2014

(51) Int. Cl.
G06F 1/32    (2006.01)
(52) U.S. Cl.
CPC ............ G06F 1/3293 (2013.01); G06F 1/3206 (2013.01); G06F 1/324 (2013.01); G06F 1/3287 (2013.01)

(58) Field of Classification Search
CPC ...... G06F 1/324; G06F 1/3287; G06F 1/3293
USPC .......................................... 713/320, 322, 324
See application file for complete search history.

(56) References Cited

U.S. PATENT DOCUMENTS

| 8,627,128 B2 * | 1/2014 | Bieswanger et al. ......... 713/322 |
| 2010/0058086 A1 | 3/2010 | Lee |
| 2010/0185882 A1 | 7/2010 | Arnold et al. |
| 2011/0099397 A1 | 4/2011 | Rotem et al. |
| 2011/0252267 A1 | 10/2011 | Naveh et al. |
| 2012/0079235 A1 | 3/2012 | Iyer et al. |
| 2013/0061064 A1 | 3/2013 | Ananthakrishnan et al. |

OTHER PUBLICATIONS

PCT/US2013/047629 Notification of Transmittal of the International Search Report and the Written Opinion of the International Searching Authority, mailed Oct. 10, 2013, 12 pages.

* cited by examiner

Primary Examiner — Albert Wang
(74) Attorney, Agent, or Firm — Blakely, Sokoloff, Taylor & Zafman LLP (57) ABSTRACT

A processor is described that includes a plurality of execution cores. The processor also includes power management circuitry to dynamically determine a number of the execution cores that, when active, will cause the processor to operate in a substantially linear power consumption vs. frequency region of operation such that performance gain as a function of power consumption increase with the number of cores is higher as compared to any other number of active execution cores within an established power envelope.

20 Claims, 6 Drawing Sheets

APPARATUS AND METHOD FOR DETERMINING THE NUMBER OF EXECUTION CORES TO KEEP ACTIVE IN A PROCESSOR

FIELD OF INVENTION

The field of invention relates generally to a computing systems, and, more specifically, to an apparatus and method for determining the number of execution cores to keep active in a processor.

BACKGROUND

Figure 1:
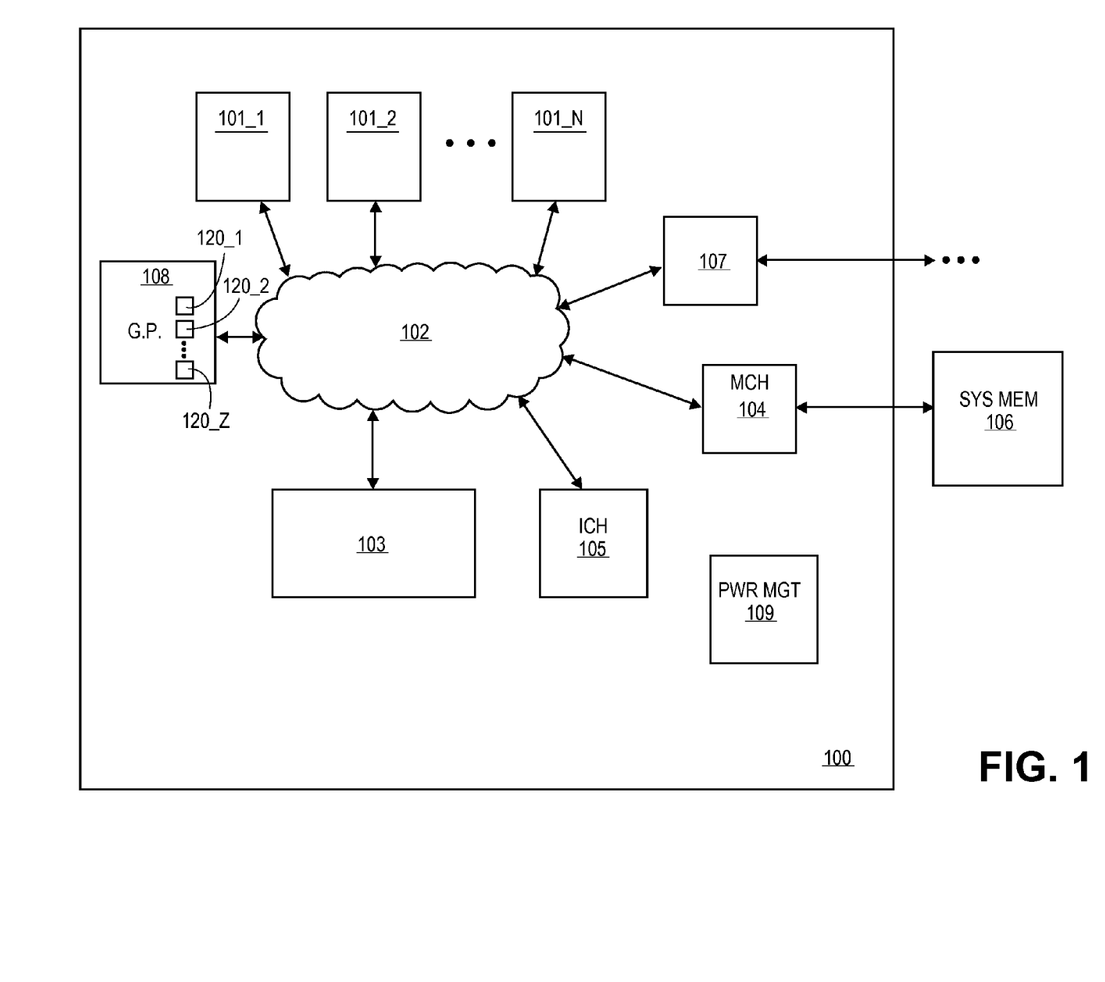
FIG. 1 shows an embodiment of a processor.

FIG. 1 shows the architecture of an exemplary multi-core processor 100. As observed in FIG. 1, the processor includes: 1) multiple processing cores 101_1 to 101_N; 2) an interconnection network 102; 3) a last level caching system 103; 4) a memory controller 104 and an I/O hub 105. Each of the processing cores contain one or more instruction execution pipelines for executing program code instructions. The interconnect network 102 serves to interconnect each of the cores 101_1 to 101_N to each other as well as the other components 103, 104, 105. The last level caching system 103 serves as a last layer of cache in the processor before instructions and/or data are evicted to system memory 106.

The memory controller 104 reads/writes data and instructions from/to system memory 106. The I/O hub 105 manages communication between the processor and "I/O" devices (e.g., non volatile storage devices and/or network interfaces). Port 107 stems from the interconnection network 102 to link multiple processors so that systems having more than N cores can be realized. Graphics processor 108 performs graphics computations. Power management circuitry 109 manages the performance and power states of the processor as a whole ("package level") as well as aspects of the performance and power states of the individual units within the processor such as the individual cores 101_1 to 101_N, graphics processor 108, etc. Other functional blocks of significance (e.g., phase locked loop (PLL) circuitry) are not depicted in FIG. 1 for convenience.

As the power consumption of computing systems has become a matter of concern, most present day systems include sophisticated power management functions. A common framework is to define both "performance" states and "power" states. The entry and/or departure from any one of these states may be controlled, for example, by power management circuitry 109. The performance of a block of logic corresponds to its ability to do work over a set time period. That is, the higher the logic block's performance the more work it can do over the set time period. Here, the primary factor that determines the logic block's performance, for a fixed configuration of the logic block, is its frequency of operation. Specifically, the higher the clock frequency applied to the logic block, the higher its performance will be. Typically, in order to operate correctly at higher frequencies, the logic block's supply voltage also needs to be raised. Both the clock speed and supply voltage level can be adjusted during runtime, e.g., by power management circuitry 109.

Another factor that can affect the logic block's performance is how many of its internal units that can do work are enabled. For example, a typical graphics processor 108 has a plurality of internal execution cores 120_1 to 120_Z each of which are designed to actually execute the snippets of graphics program code that represent the images rendered on a computer display. Usually, the graphics processor 108 is designed to support different configurations of operation that correspond to different numbers of enabled execution cores. For example, a first configuration might have all of the execution cores 120_1 to 120_Z enabled and another configuration might have only half the internal cores enabled. The number of enabled cores also affects the processor's ability to do work and therefore also affects its performance. The actual "performance" of a graphics processor is therefore a complicated mixture of the number of enabled cores and the frequency of the clock signal applied to the cores.

Adding to the complexity, unfortunately, is the reality that the power consumption of a logic block increases along with its frequency and performance.

BRIEF DESCRIPTION OF THE DRAWINGS

The present invention is illustrated by way of example and not limitation in the figures of the accompanying drawings, in which like references indicate similar elements and in which.

DETAILED DESCRIPTION

An aim of intelligent power management is, for a unit increase in frequency, to gain a higher amount of performance increase with a lesser amount of power increase. In the case of a processor such as a graphics processor having a plurality of execution cores, the processor essentially exhibits different performance/frequency vs. power curves depending on the number of the execution cores that are enabled. That is, for example, a graphics processor having a first number of enabled execution cores will exhibit different performance and power curves than the same processor with a different number of enabled cores.

Insightful power management therefore will attempt to define the performance and power curves of a graphics processor as a function of its enabled cores, and, choose a number of cores to be enabled that yields a graphics processor having the higher performance gain for a unit increase in frequency with a lesser amount of power increase as compared to alternative configurations having other numbers of enabled cores.

Figure 2:
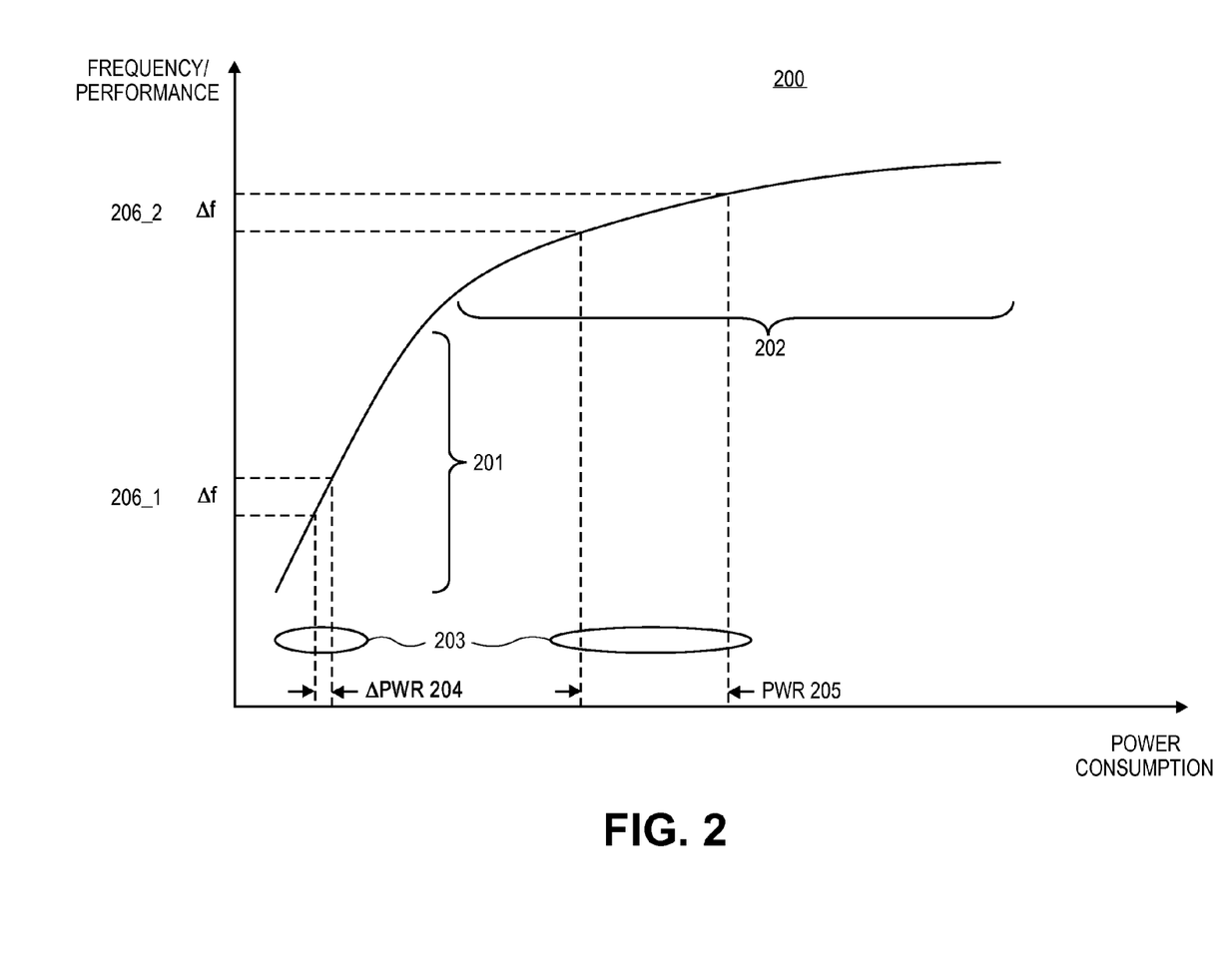
FIG. 2 shows power consumption as a function of frequency for a graphics processor configuration.

FIG. 2 shows a power vs. frequency curve 200 for a graphics processor. The curve 200 of FIG. 2 is generic for any number of enabled execution cores. That is, any configuration having a specific number of enabled cores should have a power vs. frequency tradeoff that exhibit the general shape of the curve 200 observed in FIG. 2.

The "performance" of the processor can be assumed to scale with the frequency. Thus, the vertical axis can also be viewed as the performance of the processor. The curve 200 is characterized by a linear region 201 in the lower frequencies and a non-linear region 202 in the higher frequencies.

The dynamic power consumption in the linear region 201 can be approximated as:

$$\text{Dyn\_Pwr} = CV^2 f \qquad \text{Eqn. 1}$$

where: 1) C is the total switching capacitance of the processor which includes the switching capacitance of the enabled cores; 2) V is the supply voltage applied to the graphics processor; and, 3) f is the frequency of operation. In an embodiment, in at least the lower frequency regions of the linear region 201, the supply voltage does not need to be increased with increasing frequency. Hence the term $V^2$ acts as a constant in Eqn. 1. C also acts like a constant. Hence, assuming the activity level of the graphics processor remains constant, Eqn. 1 essentially corresponds to dynamic power exhibiting a linear relationship with frequency f.

In the non linear region 202 the supply voltage V needs to be increased with increasing frequency to support proper circuit operation. As such the $V^2$ term does not act like a constant which, in turn, causes Eqn. 1 to act more like a nonlinear polynomial. Moreover, the higher supply voltages necessitated by the higher frequencies cause "leakage power" to begin to take noticeable effect. The leakage power causes even further non linear behavior in the non linear region 202 of the power vs. frequency curve 200.

Recalling that it is desirable to operate in a region with higher performance gain and lesser power increase for a unit increase in frequency, note that the linear region 201 meets this criteria better than the non linear region 202. Examination of this phenomena is depicted in onset 203, which compares the change in power consumption increase 204, 205 for the two regions 201, 202 of the curve for a same increase in frequency 206_1 and 206_2 (i.e., frequency increase 206_1 is equal to frequency increase 206_2). The increase in power consumption 205 in the non linear region 202 is greater than the increase in power consumption 204 in the linear region 201. Approximating the increase in processor performance to be the same for both frequency increases 206_1, 206_2, it is clear that the linear region 201 yields less power consumption increase than non linear region 202 for a same increase in performance. This corresponds to a more desirable region of operation.

Figure 3A:
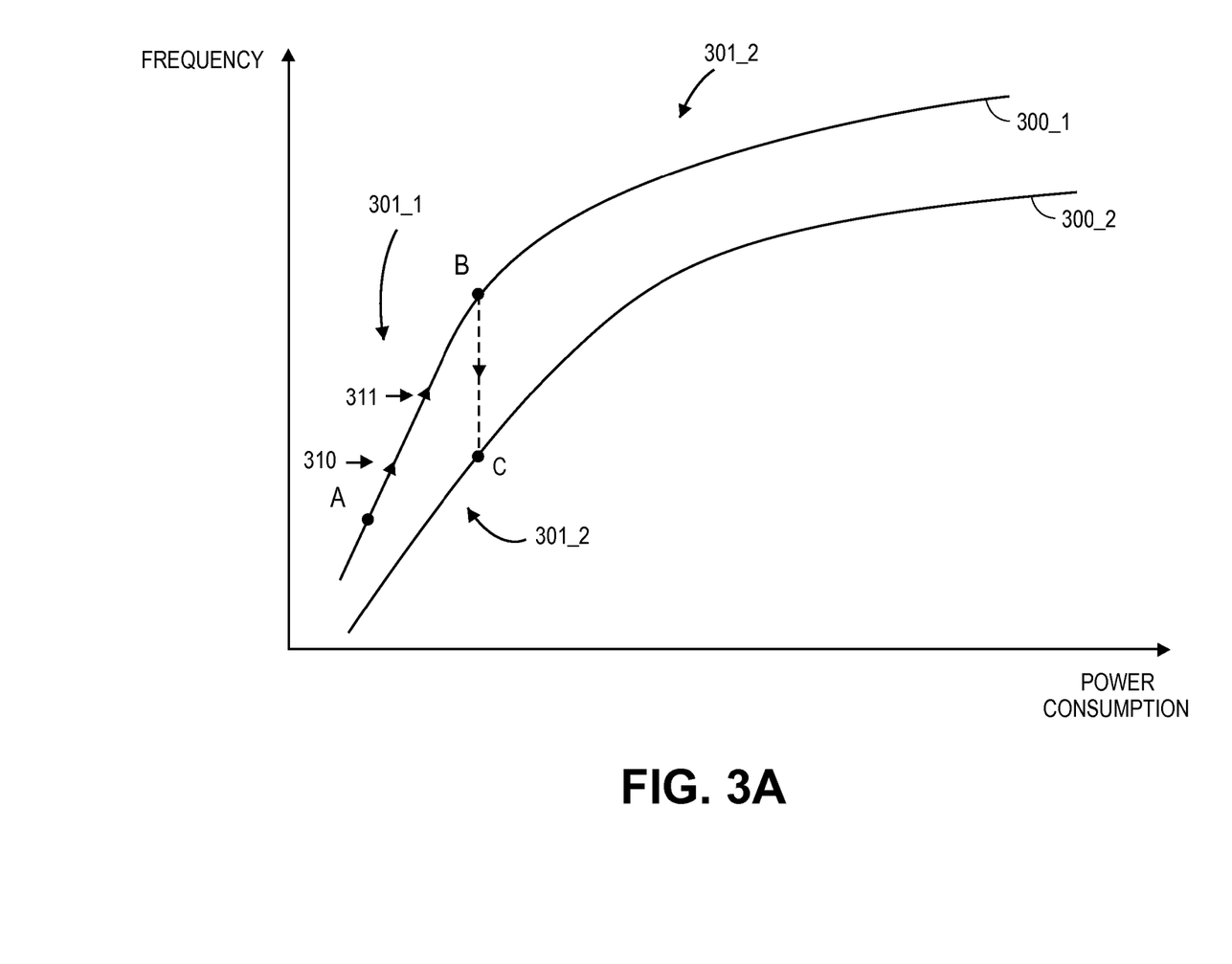
FIG. 3a shows power consumption as a function of frequency for a pair of graphics processor configurations.

FIG. 3a shows a pair of curves 300_1 through 300_2 for two different graphics processor configurations. That is, each curve represents the behavior of the processor for a specific number of enabled execution cores, where, each curve corresponds to a different number of enabled execution cores. Curve 300_1 corresponds to the fewer number of enabled cores (e.g., half the cores enabled) and curve 300_2 corresponds to the greater number of enabled cores (e.g., all cores enabled).

Comparing the two curves 300_1, 300_2, note that for a same power consumption level the configuration with the greater number of cores 300_2 has a lower frequency than the configuration with the lesser number of cores 300_1. This follows directly from the fact that the configuration with more cores has a greater surface area of circuitry being utilized and therefore can do the same amount of work as the configuration with a lesser number or cores at a slower speed than the configuration with a lesser number of cores.

Here, although it can be said that relative performance scales with frequency along any particular curve, unlike the analysis of FIG. 2, processor performance between the two curves 300_1, 300_2 is better viewed along the horizontal axis (power consumption) rather than the vertical one (frequency). That is, the processor performance between two curves 300_1, 300_2 can be viewed as being more comparable to one another at a same power consumption level (particularly when the two curves are in the same linear or non linear region of their respective curves) rather than a same frequency level. Notably, the curve utilizing more execution cores 300_2 maintains a linear region at a higher power consumption/performance than the curve utilizing less execution cores 300_1. This is consistent with the notion that more execution cores do not have to work as fast in order to perform the same amount of work as less execution cores.

Recalling that it is desirable to keep the processor operating in a linear region rather than a non linear region, and, recognizing that processor configurations having more enabled execution cores will enter the non-linear region at higher performance levels, it therefore stands to reason that an intelligent power management scheme will determine the number of appropriate execution cores for any particular performance level based on these criteria. That is, an intelligent power management scheme will attempt to map a linear region to each performance state the processor is designed to support. The linear region chosen for the performance state then determines the number of execution cores to be enabled for that performance state.

Consider an example where the graphics processor is initially placed into a lower performance state and is thereafter asked to continually raise its performance level. In this case, the performance of the processor gradually scans from its lowest performance state to its highest performance state. Here, again comparing the two curves 300_1, 300_2 of FIG. 3a, note that the linear region 301_1 of the curve having fewer execution cores 300_1 has a higher slope than the linear region 301_2 of the curve having more execution cores 300_2. This follows directly from the fact that, when operating at same frequencies, more execution cores will consume more power than less execution cores. A higher slope corresponds to less power increase for a unit of increased frequency. Therefore, the linear region 301_1 of the curve having fewer execution cores 300_1 is the better operating region of the processor.

Therefore the power management scheme should initially choose the linear region 301_1 of the curve having fewer execution cores 300_1 as the initial operating region of the graphics processor at the lower performance level. As such, the power management scheme should choose the configuration having lesser execution cores. The initial operating point at the lowest performance level is depicted as point A in FIG. 3a. As the graphics processor is incrementally stepped to higher performance levels, the applied frequency will increase but the number of enabled execution cores will remain fixed. Said another way, the power management scheme "walks up" the linear region 301_1 of curve 300_1 as indicated by arrows 310, 311.

Eventually, however, the graphics processor will reach a region that corresponds approximately to point B on the linear region 301_1 of curve 300_1. Point B is pertinent because it represents where curve 300_1 begins to depart from the linear region 301_1 and enter the non-linear region 301_2. The power management scheme therefore, in an embodiment, changes processor configuration and enables more execution cores(s) so that the processor begins to operate along the linear region 301_2 of curve 300_2 rather than the non-linear region 301_2 of curve 300_1. Said another way, when the processor is asked to operate in a performance state approximately around point B of FIG. 3a, the power management scheme reconfigures the graphics processor to operate with more execution cores so that the graphics processor begins to operate at point C and the linear region 301_2 of curve 300_2 going forward. By so doing, the graphics processor continues to operate in a linear region and therefore maintains a lower power cost as can be expended for a unit increase in frequency.

Figure 3B:
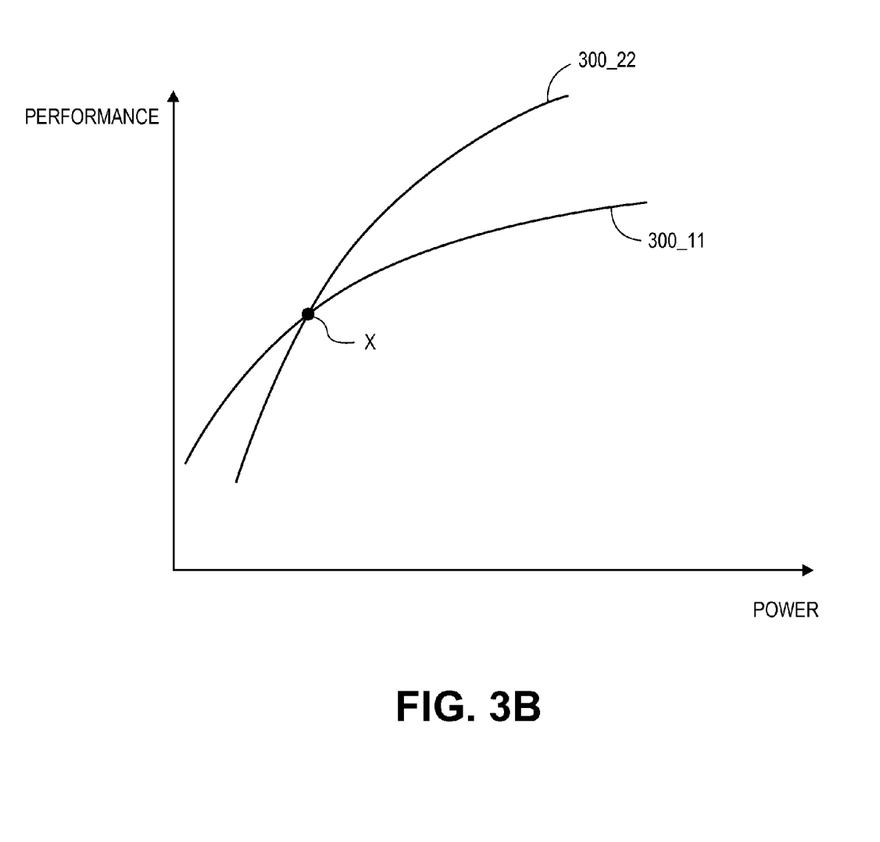
FIG. 3b shows performance as a function of power consumption for the pair of graphics processor configurations.

FIG. 3b presents another way to view a same or similar power management scheme. Whereas FIG. 3a shows frequency v. power consumption, FIG. 3b shows performance v. power consumption. Curves 300_11 and 300_22 of FIG. 3b respectively correspond to the performance v. power consumption curves 300_1 and 300_2 of FIG. 3a. That is, curve 300_11 corresponds to the performance v. power consumption trend for the configuration that enables lesser execution cores, and, curve 300_22 corresponds to the configuration that enables greater execution cores. Point X in FIG. 3b is the cross over point above which it starts becoming more energy efficient to move to a graphics configuration with a higher number of enabled execution cores. Said another way, the "cost" of remaining in the present configuration is becoming too high. Here, point X of FIG. 3b is approximately in the same region as point B of FIG. 3a in terms of power consumption. Notably, at power levels above point X, curve 300_11 is well into the nonlinear frequency to power scaling region such that the power overhead to increase performance (and frequency) is larger than the overhead to turn on additional execution units to meet the same level of performance at a much lower frequency (as represented by curve 300_22). Point B on curve 300_1 of FIG. 3a corresponds to the frequency above which it becomes more energy efficient to move to a larger number of execution units.

Alternatively if the processor is currently running with a higher number of execution units along curve 300_22, as the total available power envelope is lowered (e.g., as the maximum permitted power consumption of the graphics processor is lowered), the performance of operation decreases along curve 300_22 of FIG. 3b. When point X in FIG. 3b is reached, the cost of keeping a large number of execution cores active eats significantly into the power headroom that can be utilized in increasing the frequency of all active execution cores. At this point, therefore, it becomes more energy efficient to reduce the number of enabled execution cores and use the saved power headroom to increase the frequency of operation with fewer active execution cores. Returning again to FIG. 3a, as we traverse down in power along curve 300_2, at point C it starts becoming more energy efficient to reduce the number of active execution cores and transition to curve 301_1.

Figure 4:
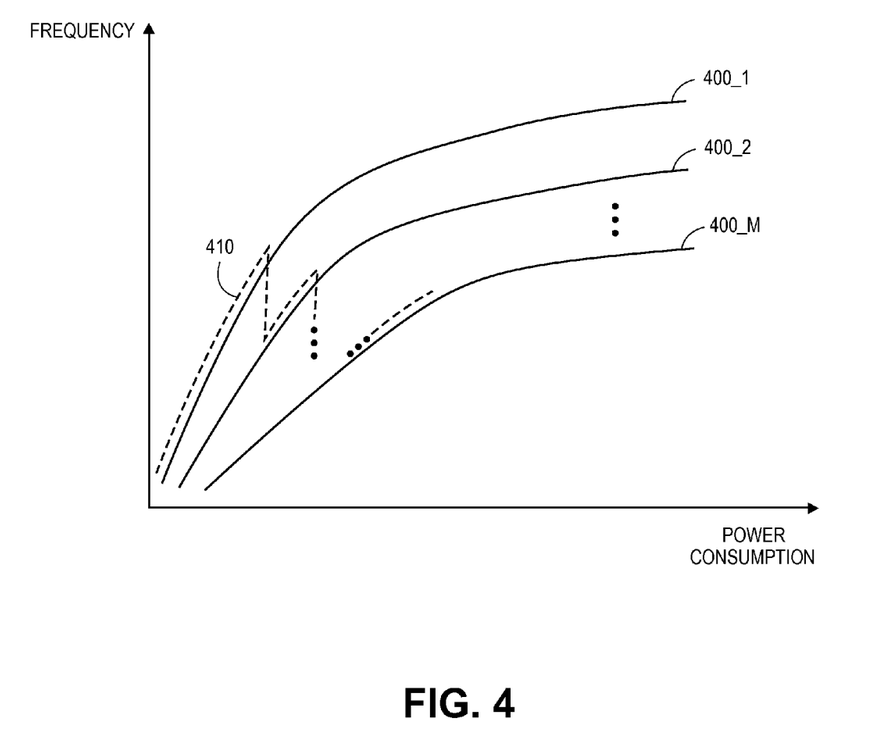
FIG. 4 shows power consumption as a function of frequency for M different graphics processor configurations.

FIG. 4 shows a more realistic realm of operating regions for a graphics processor. Whereas FIG. 3 only presented two curves 300_1, 300_2 for two different numbers of enabled execution cores, by contrast, FIG. 4 shows multiple curves 400_1 to 400_M each corresponding to a different number of enabled execution cores. Curve 400_1 corresponds to the fewest number of enabled execution cores (e.g., one execution unit) and curve 400_M corresponds to the greatest number of enabled execution cores (e.g., all execution cores). Trace 410 follows the operating regions that the power management scheme will place the graphics processor in as a function of increasing performance (again, even though FIG. 4 actually shows power consumption along the horizontal axis, the horizontal axis can also be viewed as a measure of performance as two different curves having a same power consumption, particularly in linear regions of operation, should exhibit comparable performance). Those of ordinary skill will understand that M can vary from embodiment to embodiment as well as how many execution cores are to be enabled for any given processor configuration.

According to one embodiment, information commensurate with trace 410, and/or information from which trace 410 can be determined is effectively mapped into power management circuitry of a processor. The power management circuitry effectively executes a power management scheme, with or without software assistance, consistent with the principles discussed above. The manner in which the trace information 410 is embedded into the power management circuitry and/or software can vary from embodiment to embodiment. For instance, the decision to switch to a new configuration may be based on a determination that the "cost" of remaining in the present configuration is too high.

According to one embodiment, there is an awareness that the graphics processor's curves may "drift" or otherwise change during runtime. Examples include an increase in die temperature or a change in the graphics processor's activity level. An increase in die temperature may, for instance, cause earlier onset of leakage power and therefore earlier onset of a non-linear region (that is, a curve will begin to exhibit the non linear region at a lower frequency than without the earlier onset of leakage power). A higher activity level will also consume more power than a lower activity level resulting in earlier onset of the non linear region.

Consistent with this perspective, according to one embodiment, there is an awareness that the leakage and dynamic power as a function of the number of enabled execution units can vary from one die to another due to several manufacturing factors. Thus, die specific properties (e.g., to help determine how reference leakage and switching capacitance scale with temperature and voltage) can be programmed into non volatile memory space to aid in dynamically estimating "crossover" points from one number of enabled/active execution cores to a different number of enabled execution cores. To elaborate, according to one implementation, information (such as constants/coefficients that are plugged into a "cost" equation) used to determine the cross-over point between two configurations may be programmed into the processor. As such, the cross over points may not be based purely on whether the linear V-F range is departed from or not. For example, according to one approach, each cross over point is actually chosen by looking at performance data on a variety of workloads of interest and empirically determining the frequency at which the number of enabled execution cores should be increased. Based on such empirical studies, during manufacturing, the cross over points or information used to dynamically determine the cross over points (such as coefficients for a cost equation) are programmed into non volatile configuration space in the processor die. Here, typically, the cross over point will be around the knee of the V-F curve (i.e around the point where the voltage frequency curve moves from the linear to the nonlinear range), but is not necessarily at this point exactly.

In an embodiment, a cost function such as the cost function referred to above takes the form of Cost=(A*(avg. frequency of configuration over a time interval))+(B*(leakage power of the configuration over the time interval))+(C*(dynamic power of the configuration over the time interval))+(D*(power consumption of non graphics processor components)).

As such, the power management circuitry, such as power management circuitry 109 of FIG. 1, is improved so as to include circuitry to calculate algorithms or other formulas describing the power consumption of the graphics processor for each of a plurality of configurations each having a different number of enabled execution cores. In particular, for each different configuration of the processor, the power management circuitry calculates change in power consumption as a function of change in frequency—taking into account the current state of the graphics processor such as temperature and activity level. The power management circuitry then determines which configuration corresponds to the lowest change in power consumption as a function of frequency and then selects that configuration for the graphics processor.

Figure 5:
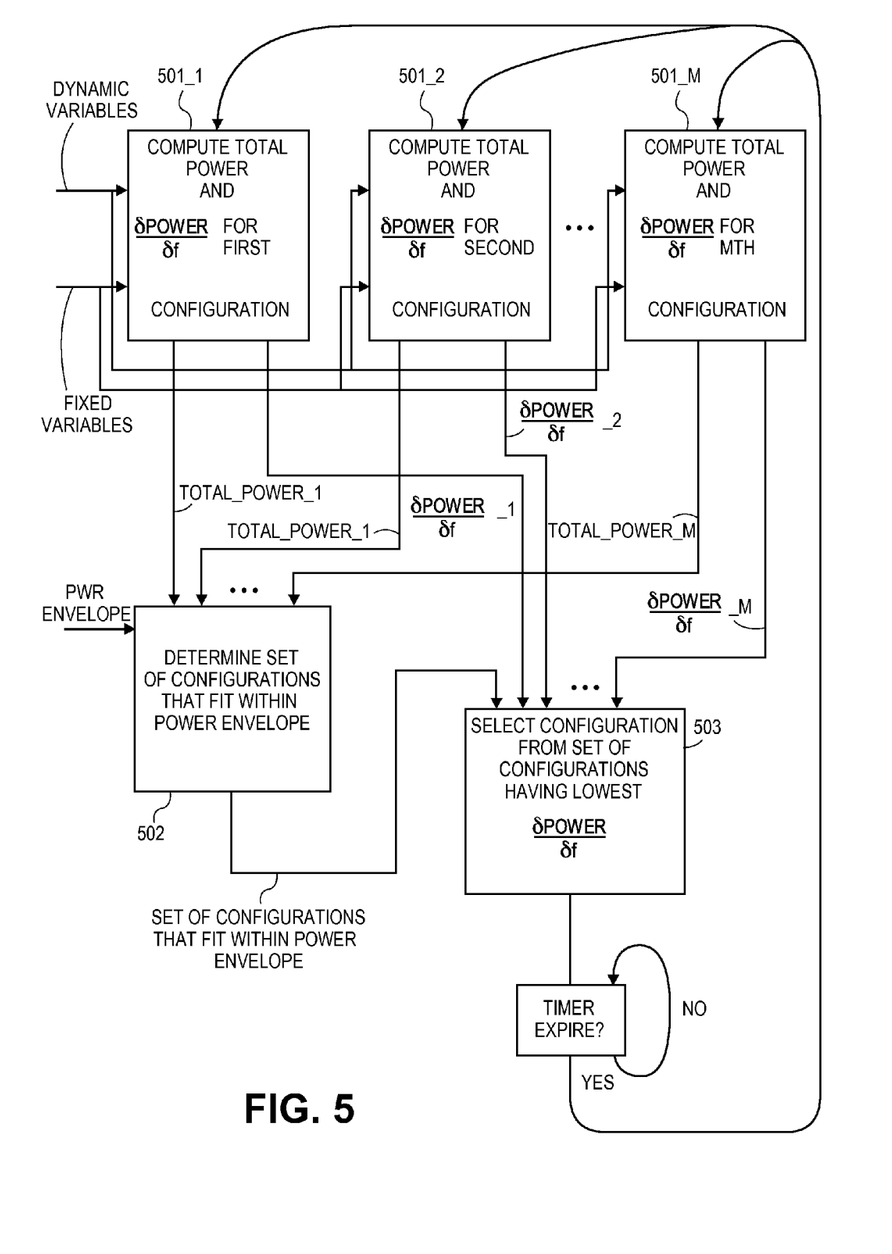
FIG. 5 shows a power management methodology.

FIG. 5 shows an embodiment of such a process as a flow method. As observed in processes 501_1 through 501_M the power management circuitry determines for each of the M different configurations (number of enabled execution cores)

supported by the processor: i) total power consumption; and, ii) change in power consumption as a function of change in frequency. The input variables provided for these calculations may be dynamic as well as static. Here, it is worth noting that deviations from the approach of FIG. 5 may be taken without departing from its import. For instance, the "chance in power consumption" calculation referred to above (and below) may instead be a "cost" function, such as the cost function discussed above, that weighs the cost of remaining in the present configuration rather the benefits of remaining in the present configuration.

The dynamic variables correspond, as discussed just above, to variables that can change during runtime such as temperature, activity level, supply voltage and frequency. The static variables correspond to more fixed features of the processor such as the total switching capacitance of the execution cores and a reference current $I_{ref}$ used to determine leakage power. The switching capacitance and reference current $I_{ref}$ can, for example, be programmed into the processor via non volatile configuration space such as 'fuses' or other read only and/or non volatile storage and/or memory space during high volume manufacturing. Parameters such as switching capacitance and $I_{ref}$ may be manufacturing dependent. Therefore they may be determined after the die has been manufactured and tested. The parameters may be specific to the die itself (e.g., two different die may be associated with different switching capacitance and $I_{ref}$ parameters). The number of enabled execution cores also corresponds to a fixed variable for each calculation 501_1 through 501_M that is different for each calculation 501_1 through 501_M.

The power management circuitry then determines, for a given "power envelope" that the graphics processor must stay within, the configuration having the lowest change in power consumption as a function of frequency amongst the configurations within the power envelope. That is, the total power consumption calculation is used to establish which configurations do not exceed the power envelope (i.e., the maximum amount of power that the graphics processor can expend) 502. Once the set of configurations that do not exceed the power envelope is determined 502, the configuration having the lowest change in power consumption per change in frequency is chosen from the set 503.

This approach should approximately trace the linear region of operation of the graphics processor across different configurations as discussed above with respect to FIG. 4, where, dynamic changes are still accounted for. Note that, according to the process of FIG. 5, the calculations are made at periodic intervals so that the graphics processor can adapt its configuration and maintain better power efficiency in light of any changes to the processor's environment such as any changes that might be reflected in the dynamic inputs to calculations 501_1 through 501_M. Additionally, note that the power envelope is also a dynamic variable that affects the determination 502 of the set of suitable configurations. The power envelope given to the graphics processor may change, for instance, as a function of the power consumption of other components within the processor (such as the power consumption of the general purpose processing cores).

The power management circuitry may be implemented as dedicated circuitry or circuitry designed to execute some kind of program code to effect the power management functionality (e.g., a micro-controller). A combination of these approaches may also be implemented. In an embodiment, the power management circuitry does not actually impose any change in performance state, but rather, suggests a change in performance state to software (e.g., graphics processor drive software). The software then makes the final decision whether a change in graphics processor performance state is to happen and implements it if so. The power management circuitry can communicate to the driver by the way of an interrupt, doorbell register, etc. The driver can establish the performance state by writing to a register in the processor that sets the performance state of the graphics processor. This may include also specifying the number of execution cores to be enabled and, possibly, other power management parameters such as the supply voltage to apply to the graphics processor and the frequency of operation for the graphics processor and/or execution cores. A software entity may query manufacturing parameters programmed into non volatile storage space on the processor, tracks activity levels on the processor and dynamically estimate the number execution units to keep active. As an alternative, the power management circuitry may perform all of these functions entirely in hardware. Again alternatively, some combination of hardware and software may perform these processes.

Notably, the present discussion is believed to be applicable to any processor composed of a plurality of same/similar execution cores (e.g., the processes discussed above can potentially be used to determine the number of general purpose processing cores to enable in a multi-core processor).

As any of the processes taught by the discussion above may be performed with a controller, micro-controller or similar component, such processes may be program code such as machine-executable instructions that cause a machine that executes these instructions to perform certain functions. Processes taught by the discussion above may also be performed by (in the alternative to the execution of program code or in combination with the execution of program code) by electronic circuitry designed to perform the processes (or a portion thereof).

It is believed that processes taught by the discussion above may also be described in source level program code in various object-orientated or non-object-orientated computer programming languages. An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A processor, comprising:
   a plurality of execution cores;
   power management circuitry to dynamically determine a number of said execution cores that, when active, will cause said processor to operate in a substantially linear power consumption vs. frequency region of operation such that performance gain as a function of power consumption increase with said number of cores is higher as compared to any other number of active execution cores within an established power envelope.

2. The processor of claim 1 wherein said execution cores are within a graphics processor.

3. The processor of claim 2 wherein said processor comprises general purpose processing cores.

4. The processor of claim 1 wherein said power management circuitry accepts one or more static and dynamic input variables.

5. The processor of claim 4 wherein said one or more static input variables include any of:
- a switching capacitance term to determine dynamic power consumption;
- a reference current term to determine leakage power consumption;
- a set of manufacturing related parameters to help determine how reference leakage and switching capacitance scale with temperature and voltage.

6. The processor of claim 4 wherein said one or more dynamic input variables include any of:
- supply voltage;
- temperature;
- activity level of an execution core.

7. A processor, comprising:
- a plurality of execution cores;
- power management circuitry to determine a number of said execution cores to enable for operation by determining:
  - a set of configurations of said processor that remain within a power envelope established for said processor, each configuration corresponding to a different number of active execution cores;
  - a change in power consumption as function of change in frequency parameter for each of said configurations within said set of configurations;
  - a configuration from said set of configurations having a lowest change in power consumption as a function of change in frequency parameter from amongst the other configurations of said said set.

8. The processor of claim 7 wherein said execution cores are within a graphics processor.

9. The processor of claim 8 wherein said processor comprises general purpose processing cores.

10. The processor of claim 7 wherein said power management circuitry accepts one or more static and dynamic input variables.

11. The processor of claim 10 wherein said one or more static input variables include any of:
- a switching capacitance term to determine dynamic power consumption;
- a reference current term to determine leakage power consumption;
- a set of manufacturing related parameters to help determine how reference leakage and switching capacitance scale with temperature and voltage.

12. The processor of claim 10 wherein said one or more dynamic input variables include any of:
- supply voltage;
- temperature;
- activity level of an execution core.

13. A method, comprising:
- determining a set of configurations of a processor that remain within a power envelope established for said processor, each configuration corresponding to a different number of active execution cores of said processor;
- determining a change in power consumption as function of change in frequency parameter for each of said configurations within said set of configurations; and,
- determining a configuration from said set of configurations having a lowest change in power consumption as a function of change in frequency parameter from amongst the other configurations of said set.

14. The method of claim 13 wherein said configuration corresponds to a number of active execution cores that causes said processor to operate with a higher gain in performance as a function of power consumption than any other number of active execution cores for a region that said processor is operating within.

15. The method of claim 13 wherein said execution cores are within a graphics processor.

16. The method of claim 13 wherein said execution cores are general purpose processing cores within a multi-core processor.

17. The method of claim 13 further comprising accepting one or more static and dynamic input variables.

18. The method of claim 17 wherein said one or more static input variables include any of:
- a switching capacitance term to determine dynamic power consumption;
- a reference current term to determine leakage power consumption; and
- a set of manufacturing related parameters to help determine how reference leakage and switching capacitance scale with temperature and voltage.

19. The method of claim 17 wherein said one or more dynamic input variables include any of:
- supply voltage;
- temperature;
- activity level of an execution core.

20. A machine readable storage medium, that is not a signal, containing stored program code that when processed by a digital processing system causes a method to be performed, comprising:
- determining a set of configurations of a processor that remain within a power envelope established for said processor, each configuration corresponding to a differ ent number of active execution cores of said processor;
- determining a change in power consumption as function of change in frequency parameter for each of said configurations within said set of configurations; and,
- determining a configuration from said set of configurations having a lowest change in power consumption as a function of change in frequency parameter from amongst the other configurations of said set.

* * * * *